May 15, 1923.
L. POLI
1,455,409
SAFETY FASTENING DEVICE FOR NONSKID CHAINS
Filed March 28, 1921
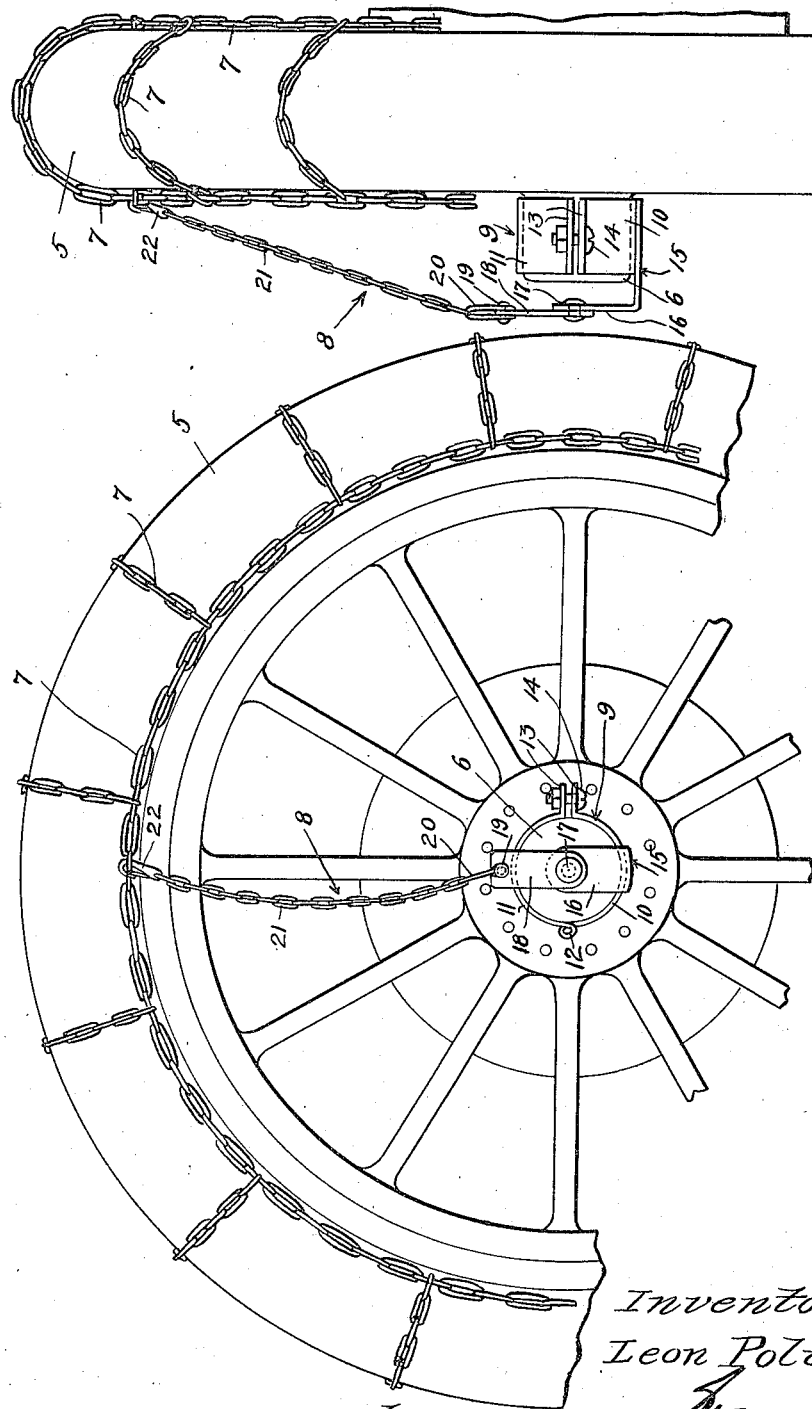
Inventor
Leon Poli Patented May 15, 1923.

1,455,409

UNITED STATES PATENT OFFICE.

LEON POLI, OF WALSENBURG, COLORADO.

SAFETY FASTENING DEVICE FOR NONSKID CHAINS.

Application filed March 28, 1921. Serial No. 456,362.

*To all whom it may concern:*

Be it known that I, LEON POLI, a citizen of the United States, residing at Walsenburg, Huerfano County, State of Colorado, have invented new and useful Improvements in Safety Fastening Devices for Nonskid Chains, of which the following is a specification.

My invention relates to safety fastening devices for non-skid chains, and is particularly adapted to prevent the loss of said chains when they accidentally become detached from the vehicle wheel upon which they are mounted, when in motion.

The above and other objects of my invention will be more fully disclosed in the following description, will be pointed out in the claim, and will be embodied in the accompanying drawings, in which:

Fig. 1 represents a fragmental side view of a vehicle wheel, showing a non-skid chain mounted thereon and my safety device applied thereto.

Fig. 2 is an edge view of the same.

In carrying out my invention, 5 represents a vehicle wheel, 6 the hub thereof, and 7 a non-skid chain of any well known type mounted in the usual manner thereon.

My safety fastening device 8, comprises a clamping member 9 which is formed of two semi-circular straps 10 and 11 hinged together at 12, each of said straps being provided at its free end with an outwardly projecting ear 13. The ears 13 are each provided with an aperture through which a bolt 14 is adapted to pass. By this construction it will be obvious that the clamping member 9 may be readily and conveniently secured to the hub 6 of the vehicle wheel.

Secured to the outer periphery of member 10 is one extension of an angle iron 15, the other extension 16 of said angle iron projecting in front of hub 6 as clearly shown in the drawings. Pivoted at 17 to extension 16 is one end of a link 18, said pivoting point 17 being disposed directly opposite the center of rotation of the wheel hub 6. Pivoted at 19 to the opposite end of link 18 is a shackle 20, and secured to said shackle is one end of a chain 21, the opposite end of said chain being provided with a spring clasp 22 adapted to engage with a link of the non-skid chain 7.

By the foregoing recited construction it will be obvious that should the non-skid chain 7 become accidentally disengaged from the vehicle tire and drop on the ground while the vehicle is in motion, the chain 21 which is secured to the hub of the wheel will prevent the non-skid chain from becoming lost, and that said chain will drag evenly along the ground behind the wheel without danger of its rotating or becoming entangled therewith. It is also to be noted that by pivoting the link 18 opposite the center of rotation of the vehicle wheel, the normal creeping of the non-skid chain on the vehicle tire will not be impaired and the securing chain 21 will be free to follow along with the non-skid chain without in any manner becoming entangled with the vehicle wheel.

Although I have shown and described the connecting member between the wheel hub and the non-skid chain, as of a flexible nature such as the chain 21, which is preferable for convenience of storage, it will be obvious that this connection may be made by means of a rod which will serve the purpose equally as well.

What I claim is:

A safety device for tread chains having a detachable hub engaging clamp provided with an arm extending from adjacent the margin of the clamp toward the center of the hub, a swivel pin on said arm disposed in axial alignment with the hub with which the clamp is engaged, and a safety element having a swivel connection with said pin and provided with means for engaging a tread chain.

In witness that I claim the foregoing I have hereunto subscribed my name this 8th day of March, 1921.

LEON POLI.

Witness:
C. VICTOR MAZZONE.